US000001462H

United States Statutory Invention Registration [19]

[11] Reg. Number: H1462

Walker, Jr.

[43] Published: Jul. 4, 1995

[54] SOLID STATE ELECTROCHEMICAL LITHIUM/POLYMER CELL

[75] Inventor: Charles W. Walker, Jr., Neptune, N.J.

[73] Assignee: The United States of America as represented by the Secretary of the Army, Washington, D.C.

[21] Appl. No.: 153,948

[22] Filed: Nov. 1, 1993

[51] Int. Cl.[6] ..... H01M 6/18

[52] U.S. Cl. ..... 429/191; 429/212; 429/213

[58] Field of Search ..... 429/191, 212, 213

[56] References Cited

U.S. PATENT DOCUMENTS

| | | | |
|---|---|---|---|
| 4,543,306 | 9/1985 | DuBois et al. | 429/213 |
| 4,939,050 | 7/1990 | Tapsawa et al. | 429/213 |
| 5,225,296 | 7/1993 | Ohsawa et al. | 429/218 |

*Primary Examiner*—Donald P. Walsh
*Assistant Examiner*—Anthony R. Chi
*Attorney, Agent, or Firm*—Michael Zelenka; Roy E. Gordon

[57] ABSTRACT

A lithium electrochemical cell is provided that provides many cycles without loss in capacity. The cell contains an ion conducting solid polymer electrolyte and an electronically conductive, anion-intercalating polymer cathode.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SOLID STATE ELECTROCHEMICAL LITHIUM/POLYMER CELL

GOVERNMENT INTEREST

The invention described herein may be manufactured, used, and licensed by or for the Government for governmental purposes without the payment to me of any royalty thereon.

FIELD OF INVENTION

The invention relates in general to lithium electrochemical cells and in particular to solid state electrochemical lithium/polymer cells that provide many cycles without a loss in capacity.

BACKGROUND OF THE INVENTION

Two major areas of consideration in the development of lithium electrochemical cells are to find a liquid electrolyte that does not react with metallic lithium and to identify a lithium anion intercalating cathode as for example $Li_xCoO_2$, $Li_xTiS_2$, and $Li_xMn_2O_4$ that provides many cycles without loss in capacity. The absence of a liquid component would reduce or eliminate corrosion of the metallic lithium anode, as well as harmful chemical reactions at the cathode.

SUMMARY OF THE INVENTION

The general object of this invention is to provide an improved lithium electrochemical cell. A more particular object of the invention is to provide such a cell that does not contain a liquid component that can cause corrosion of the metallic lithium anode as well as harmful chemical reactions at the cathode. A still further object of the invention is to provide such a lithium electrochemical cell that allows for high cycle life and good capacity retention. Another object of the invention is to provide such a lithium electrochemical cell that can be used as either a primary cell or a rechargeable cell.

It has now been found that the aforementioned objects can be attained by making a solid state lithium electrochemical cell that contains an ion conducting solid polymer electrolyte and an electronically conductive, anion intercalating polymer cathode.

Absence of a liquid component reduces or eliminates corrosion of the metallic lithium anode, as well as harmful chemical reactions at the cathode. At the cathode, anions are intercalated rather than cations, with anion-doped polymer being electrically conductive, and undoped polymer being electrically resistive. The polymer cathode is somewhat flexible, allowing anion doping and undoping to occur without structured damage, allowing for high cycle life and good capacity retention.

The use of the solid state lithium electrochemical cells as rechargeable cells allows for the development of thin film rechargeable mono and bipolar lithium cells. The novel features of the cell include a system that is completely solid state. Moreover, polymers are employed as both cathode and electrolyte. Then, too, anions (instead of lithium cations) are shuttled in and out of the cathode. The polymeric electrolyte and cathode components total only a few microns in thickness. This allows for the manufacture of a very thin, multicell, high voltage battery.

Because the system is solid state, any desired geometric form is possible, and battery packages can be sealed in metallized plastic films. This reduces packaging weight considerably compared to the heavy-walled metal cans normally used for cells containing liquid electrolyte.

A solid electrolyte according to the invention includes a polymer host containing dissolved lithium salt, allowing the movement of $Li^+$ and $X^-$ ions between the electrodes. There are many advantages associated with the use of ionically conducting polymers as for example (poly (ethylene oxide)) such as high speed processing of thin, light weight bipolar cells. Solid polymer electrolyte (SPE) films can act both as a mechanical separator between the anode and cathode, and as a binder/adhesive to insure contact between electrodes. Elasticity allows the SPE to conform to electrode volume changes during cycling. Further, safety is enhanced in that there is no liquid electrolyte to leak from cells. The SPE that can be used in the invention include at least one lithium salt selected from the group consisting of $LiClO_4$, $LiBF_4$, $LiAsF_6$, $LiCF_3So_3$, and $LiN(CF_3So_2)_2$ dissolved in at least one polymer host selected from the group consisting of poly (ethylene oxide), poly(propylene oxide) poly(dioxolane) and poly (methylmethacrylate).

Electropolymerized films on the order of one micron in thickness can be prepared to serve as the cathode material, that, when doped with anions on charging, are electronically conductive. Upon discharge, anions return to the electrolyte. Suitable solid polymer cathodes that can be used in the invention include poly(3-methylthirophene) poly(alkyl-thiophene) poly(aniline) poly(acetylene), or mixtures thereof.

The invention provides a solid state lithium electrochemical system that utilizes thin, solid polymer films as electrolyte and cathode, and that includes an anode of either metallic lithium or a lithium intercalating material. Such lithium intercalating materials include lithium alloy, $LiC_6$, lithiated graphite, and lithiated petroleum coke.

An all-solid state lithium electrochemical cell is made with an ionically conducting SPE and an electronically conductive polymer cathode. The SPE is comprised of lithium salts ($LiCF_3SO_3$, $LiN(CF_3SO_2)_2$) dissolved in poly(ethylene oxide) (PEO). The cathode is poly(3-methylthiophene) (PMT). In this cell, the polymer cathode accepts anions common to the SPE on charge, and releases anions into the SPE on discharge. Likewise, lithium ions from the SPE are plated as metallic lithium during charge, and released to the SPE on discharge as seen in the following equation:

$$Li^o + PMT^+X^- \underset{\text{CHARGE}}{\overset{\text{DISCHARGE}}{\rightleftharpoons}} Li^+ + PMT^o + X^-$$

Since anions and cations are simply being shuttled between electrodes, no new products are formed during charge or discharge, so no chemical reactions detrimental to cycle life occur. Therefore, exceptional cycle life and capacity are seen.

DESCRIPTION OF THE PREFERRED EMBODIMENT

Electrochemical polymerization of poly(3-methylthiophene) (PMT) films is accomplished in a 125 ml European flask using a 1 $cm^2$ platinum flag counter electrode, a saturated sodium calomel reference electrode, and a platinum rod working electrode. One end of the working electrode is polished to a mirror finish with an alumina/water paste and sheathed in heat shrinkable Teflon, exposing a 0.071 $cm^2$ surface area. The cell is flooded with a solution containing 0.1M 3-methylthiophene monomer dissolved in acetonitrile that also contains a 0.1M concentration of either tetrabutylammonium tetrafluoroborate, $LiCF_3SO_3$, or $LiN[(CF_3SO_2)]_2$. Ultra high purity argon is bubbled through the electrolyte to remove any oxygen. The PMT films, 1.4 microns thick, are polymerized at 10 mA $cm^{-2}$ by passing a charge of 0.25 C $cm^{-2}$ five (1.25 C $cm^{-2}$ total), with five minute periods at open circuit between depositions. The PMT- covered electrode is rinsed in acetonitrile and dried under vacuum at 50° C. Polymerized films contain anions corresponding to the salt used: $BF_4^-$, $CF_3SO_3^-$, $N(CF_3SO_2)_2^-$.

PEO(MW=$4\times10^6$), $LiCF_3SO_3$, and $LiN(CF_3SO_2)_2$ in a molar ratio of 20:1:1 are dissolved in acetonitrile that has been distilled while bubbling dry argon to form a viscous solution. PMT-covered electrodes are fitted with a small lithium metal reference electrode, then dipped into the polymer solution four or five times. Between each dip, films are allowed to stand to permit the $CH_3CN$ to evaporate, leaving a solid polymer electrolyte covering the PMT and reference electrodes. Finished electrodes are dried overnight under active vacuum at 50° C. Laboratory cells are constructed by pressing the electrodes against metallic lithium (anodes) and maintaining slight pressure to ensure mechanical contact. Cell cycling is performed galvanostatically with an EG&G PAR Models 173 potentiostat/galvanostat controlled by a HP86B computer.

EXAMPLE 1

The electrochemical cell or system is:

$$Li/(PEO)_{20}(LiCF_3SO_3)_1,(LiN[CF_3S)_2]_2)_1/PMT\text{-}BF_4^-$$

In this cell, PMT is polymerized with $BF_4$ as the dopant anion. The cell is discharged at 5 $\mu A\ cm^{-2}$ to a 2.0 V cutoff, and charged at 2.5 $\mu A$ to a 3.8 V cutoff for 170 cycles at a temperature between 19° C. and 22° C. Good retention of capacity is observed and mean cycling efficiency is 98.4%. Initial load potential is above 3.6 V with voltage gradually decreasing until near the end of discharge when voltage drags abruptly from about 3.0 V to the 2.0 V cutoff. There is an increase in capacity over the first few cycles that is explained by an increase in the level of polymer doping as the PMT becomes better able to accommodate anions.

EXAMPLE 2

This electrochemical system or cell is:

$$Li/(PEO)_{20}(LiCF_3SO_3)_1(LiN[CF_3SO_2]_2)_1/PMT\text{-}CF_3SO_3^-$$

In this cell, the PMT dopant anion ($CF_3SO_3^-$) introduced during electropolymerization is common to anions present in the electrolyte. Discharge (5 $\mu A\ cm^{-2}$ to 2.0 V) and charge (3.5 $\mu A\ cm^2$ to 3.8 V) capacity increases over the first few cycles from 2 mA h $g^{-1}$ to 3.5 mA h $g^{-1}$ until cycle 19, where capacity drops to 1.2 mA h $g^{-1}$. Thereafter, capacity is very consistent, fading to slightly above 1.0 mA h $g^{-1}$ by cycle 87.

EXAMPLE 3

The electrochemical cell or system is:

$$Li/(PEO)_{20}(LiCF_3SO_3)_1(LiN[CF_3SO_2]_2)_1/PMT\text{-}N(CF_3SO_2)_2^-$$

In this instance, the imide anion ($N(CF_3SO_2)_2^-$) initially doped into the PMT is also common to the electrolyte. Discharge and charge are both at a rate of 5 $\mu A\ cm^{-2}$ between voltage cutoffs of 2.0 V and 3.8 V respectively. Capacity increases over the first few cycles to 12.9 mA h $g^{-1}$. At cycle 25, capacity falls to 6.6 mA h $g^{-1}$ then recovers slightly to remain between 7.5 to 8.5 mA h $g^{-1}$ through cycle 72.

I wish it to be understood that I do not desire to be limited to the exact details of construction shown and described for obvious modifications will occur to a person skilled in the art.

What is claimed is:

1. A solid state electrochemical cell including metallic lithium as an anode, $(PEO)_{20}(LiCF_3SO_3)_1(LiN[CF_3SO_2])$ as a solid polymer electrolyte and and poly (3-methylthiophene as a solid polymer cathode.

2. A solid state electrochemical cell including metallic lithium as an anode, $(PEO)_{20}(LiCF_3SO_3)_1(LiN[CF_3SO_2]_2)_1$ as a solid polymer electrolyte and poly 3-methylthiophene-$BF_4$ as a solid polymer cathode.

3. A solid state electrochemical cell including metallic lithium, as an anode, $PEO)_{20}(LiCF_3SO_3)_1(LiN[CF_3SO_2]_2)_1$ as a solid polymer electrolyte and poly(3-methylthiophene-$CF_3SO_3$ as solid polymer cathode.

4. A solid state electrochemical cell including metallic lithium as an anode, $(PEO)_{20}(LICF_3SO_3)_1(LiN[CF_3SO_2]_2)_1$ as a solid polymer electrolyte, and poly(3-methylthiophene)-$N(CF_3SO_2)_2$ as a solid polymer cathode.

* * * * *